US007952771B2

(12) United States Patent
Takeuchi et al.

(10) Patent No.: US 7,952,771 B2
(45) Date of Patent: May 31, 2011

(54) IMAGE DATA PROCESSING DEVICE, IMAGE DISPLAY DEVICE, DRIVING VIDEO DATA GENERATING METHOD AND COMPUTER PROGRAM PRODUCT

(75) Inventors: Kesatoshi Takeuchi, Shioziri (JP); Takahiro Sagawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 967 days.

(21) Appl. No.: 11/882,848

(22) Filed: Aug. 6, 2007

(65) Prior Publication Data

US 2008/0037074 A1 Feb. 14, 2008

(30) Foreign Application Priority Data

Aug. 10, 2006 (JP) ................................ 2006-218030

(51) Int. Cl.
*H04N 1/04* (2006.01)

(52) U.S. Cl. ........ 358/471; 358/501; 358/505; 358/515; 358/518

(58) Field of Classification Search .................. 358/501, 358/505, 515, 518, 471
See application file for complete search history.

(56) References Cited

U.S. PATENT DOCUMENTS

| | | | | |
|---|---|---|---|---|
| 7,221,335 | B2 * | 5/2007 | Jeong | 345/63 |
| 7,391,396 | B2 * | 6/2008 | Igarashi | 345/87 |
| 2006/0092164 | A1 | 5/2006 | Takeuchi et al. | |

FOREIGN PATENT DOCUMENTS

| | | |
|---|---|---|
| JP | A-2002-132220 | 5/2002 |
| JP | A-2002-132224 | 5/2002 |
| JP | A-2003-241714 | 8/2003 |
| JP | A-2005-352463 | 12/2005 |
| JP | A-2006-145799 | 6/2006 |
| JP | A-2006-154751 | 6/2006 |

* cited by examiner

*Primary Examiner* — Houshang Safaipour
(74) *Attorney, Agent, or Firm* — Oliff & Berridge, PLC

(57) ABSTRACT

This image data processing device DP1 is equipped with a frame video data acquiring unit 40 and driving video data generator 50. The frame video data acquiring unit 40 acquires first frame video data FR(N) that shows first original images, as well as second frame video data FR(N+1) that show second original images that are displayed following the first original images. The driving video data generator 50 generates first through fourth driving video data DFI1(N), DFI2(N), DFI1 (N+1), DFI2(N+1) that respectively show first through fourth driving images to be sequentially displayed on the image display device. First and second driving video data DFI1(N), DFI2(N) are generated based on first frame video data FR(N). Third and fourth driving video data DFI1(N+1), DFI2(N+1) are generated based on second frame video data FR(N+1). The color of the pixel in a part of the second driving image constitutes the complementary color of the color of the corresponding pixel in the first driving image. The color of the pixel in a part of the third driving image constitutes the complementary color of the color of the corresponding pixel to the fourth driving image.

11 Claims, 9 Drawing Sheets

IMAGE DATA PROCESSING DEVICE, IMAGE DISPLAY DEVICE, DRIVING VIDEO DATA GENERATING METHOD AND COMPUTER PROGRAM PRODUCT

BACKGROUND

1. Technical Field

This invention relates to technology for generating driving video data in order to drive an image display device.

2. Related Art

Traditionally, when displaying moving images on a display device, slightly differing still images have been sequentially displayed at a predetermined frame rate. However, the type of problem noted below has occurred with hold-type display devices in which an almost constant image is retained in the device until the image is refreshed by means of the following image signal. Specifically, the image appears blurred to the person viewing it, due to the sequential replacement of slightly differing still images within the screen.

On the other hand, technology has been used in which image blur has been reduced by inserting a black image at moments in time between the displayed still image and the following still image. However, with such arrangements, the image may appear to flicker to the viewer.

The invention has been developed in order to address the above-mentioned problems of the prior art at least in part, and has as an object to provide a display whereby the viewer will not readily perceive any blurring or flicker.

The entire disclosure of Japanese patent application No. 2006-218030 of SEIKO EPSON is hereby incorporated by reference into this document.

SUMMARY

As one aspect of the present invention, an image data processing device for generating driving video data for driving an image display device may be adopted. The image data processing device may have a frame video data acquiring unit and a driving video data generating unit. The frame video data acquiring unit acquires first and second frame video data. The first frame video data represents a first original image. The second frame video data represents a second original image that is to be displayed after the first original image. The driving video data generating unit generates first through fourth driving video data that respectively represent first through fourth driving images to be sequentially displayed on the image display device.

The driving video data generating unit generates the first and second driving video data based on the first frame video data; and generates the third and fourth driving video data based on the second frame video data. The color of pixel in a part of the second driving image constitutes first complementary color of color of corresponding pixel in the first driving image, or color that can be generated by mixing the first complementary color and an achromatic color. The color of pixel in a part of the third driving image constitutes second complementary color of color of corresponding pixel in the fourth driving image, or color that can be generated by mixing the second complementary color and an achromatic color. The pixel in the part of the second driving image and the pixel in the part of the third driving image respectively belong to areas that are not mutually overlapping within an image.

"The corresponding pixel" for a specific pixel means a pixel in the same position in the images or on the display device as the specific pixel. In case where a pixel p0 in a part of the second driving image is positioned at the point on pth row from the top (p is an integer greater than 0) and qth column from the left (q is an integer greater than 0) in the second image or on the display device, the corresponding pixel p1 in the first driving image is positioned at the same point on pth row from the top and qth column from the left in the first image or on the display device.

In the embodiment described above, a process such as the following can be carried out, for example. The process steps may be conducted in an order that is different from the order noted below.

(a) The first driving video data is generated based on first frame video data that represents a first original image. The first driving video data represents a first driving image to be displayed on an image display device.

(b) The second driving video data is generated based on the first frame video data. The second driving video data represents a second driving image to be displayed on the image display device after the first driving image.

(c) The third driving video data is generated based on second frame video data that represents a second original image to be displayed after the first original image. The third driving video data represents a third driving image to be displayed on the image display device after the second driving image.

(d) The fourth driving video data is generated. The fourth driving video data represents a fourth driving image to be displayed on the image display device after the third driving image based on the second frame video data.

In such an embodiment, in reproducing video or moving images, when the first through fourth driving images are sequentially displayed, the synthesized images of the second and third driving images are visible to the eyes of the viewer (user) between the first and fourth driving images. Accordingly, to the eyes of the viewer, by means of the complementary colors belonging to the second and third driving images, the colors of the other driving images are at least partly canceled out, and the resulting image appears as a synthesized image. Consequently, moving images can be displayed so that the viewer will not readily detect any blurring or flickering, as compared with cases in which moving images are reproduced by consecutively displaying the first and fourth driving images.

Other images may be displayed between the consecutive display of the first through fourth driving images. However, it is desirable that other images not be displayed between the consecutive display of the second and third driving images.

"Color that can be generated by the mixing of complementary color of the corresponding pixel with black or white," are also included within the scope of "color that can be generated by the mixing of complementary color of the corresponding pixel with an achromatic color." "Color that can be generated by the mixing of complementary color of the corresponding pixel with achromatic color" may include "color that can be generated by the mixing of complementary color of the corresponding pixels with an achromatic colors with an arbitrary brightness, at an arbitrary ratio."

In regards to the brightness of "color that may be generated by the mixing of complementary color of the corresponding pixel with achromatic color," it is preferable that the color has brightness in a predetermined range of brightness that includes the brightness of "the color of the corresponding pixel." With this embodiment, the value of the brightness of the synthesized image observed by the viewer is close to that of the brightness of the first and fourth driving images. As a result, an image may be reproduced in which it is more unlikely for the viewer to detect any image flickering.

The following embodiment may also be preferable. The first driving image is an image which is obtainable by enlarging or reducing the first original image. The color of pixel in other part of the second driving image is same color as color of corresponding pixel in the first driving image. The fourth driving image is an image which is obtainable by enlarging or reducing the second original image. The color of pixel in other part of the third driving image is same color as color of corresponding pixel to the fourth driving image.

With such an embodiment, when images are reproduced, the viewer will perceive that the displayed image moves from the first driving image to the fourth driving image smoothly. "Magnification or contraction" referred to here includes "multiplying by 1."

It is more preferable that the sum of sets of the pixels in the part of the second driving image and the pixels in the part of the third driving image constitute all of the pixels making up the image.

The pixel in the part of the second driving image and the pixel in the part of third driving image described above can be constituted, for example, so as to have the following relationship. Specifically, the pixels in the part of the second driving image are included in the first bundles of horizontal lines in the image displayed on the image display device. Each of the first bundles has m (m is an integer equal to or greater than 1) horizontal lines adjacent to one other. Each two adjacent first bundles sandwich m horizontal lines between them. The pixels in the part of the third driving image are included in the second bundles of horizontal lines in the image displayed on the image display device. Each of the second bundles has m of horizontal lines adjacent to one other. Each second bundle is sandwiched by the pair of the first bundle. It is more preferable when m=1.

The pixel in the part of the second driving image and the pixel in the part of third driving image described above can be constituted, for example, so as to have the following relationship. Specifically, the pixels in the part of the second driving image are included in the first bundles of vertical lines in the image displayed on the image display device. Each of the first bundles has n (n is an integer equal to or greater than 1) vertical lines adjacent to one other. Each two adjacent first bundles sandwich n vertical lines between them. The pixels in the part of the third driving image are included in the second bundles of vertical lines in the image displayed on the image display device. Each of the second bundles has n of vertical lines adjacent to one other. Each second bundle is sandwiched by the pair of the first bundle. It is more preferable when n=1.

The pixel in the part of the second driving image and the pixel in the part of third driving image described above can be constituted, for example, so as to have the following relationship. Specifically, the pixel in the part of the second driving image and the pixel in the part of third driving image are respectively included in the first and second block units in the image displayed by the image display device. Each of the first and second block units is the block unit of r pixels (r is an integer equal to or greater than 1) in the horizontal direction and s pixels (s is an integer equal to or greater than 1) in the vertical direction in the image being displayed on the image display device. The first and second block units are positioned alternately in the horizontal and vertical directions on the image display device. The first and second block units are placed in a complementary relationship. Moreover, it is most preferable when r=s=1.

The following embodiments may also be preferable. An amount of movement of the second original image from the first original image is calculated based on the first and second frame video data. The color of the pixel in the part of the second driving image is determined based on the first frame video data and the amount of movement. The color of the pixel in the part of the third driving image is determined based on the second frame video data and the amount of movement.

With this embodiment, the second and third driving images can be generated so as to appropriately according to the amount of movement of the frame video data of 1 and 2.

It is preferable that the color of the pixel in the part of the second driving image is determined such that the greater the amount of movement is, the more the color of the pixel in the part of the second driving image is approximate to the first complementary color. It is also preferable that the color of the pixel of the part of the third driving image is determined such that the smaller the amount of movement is, the more the color of the pixels in the part of the third driving image is approximate to an achromatic color.

With this embodiment, the second and third driving images can be generated so as to reduce image blur in moving images having a great amount of movement, and so as to eliminate flickering for moving images having a small amount of movement.

Within the corresponding relationship that "the greater the amount of movement is, the more the color of the pixel in the part of the second driving image is approximate to the first complementary color", it is permissible to partially maintain a constant pixel color, even if the amount of movement changes. In other words, with this corresponding relationship, when the first color corresponding to the first volume of the movement, and the second color corresponding to the second volume of the movement which is greater than the volume of the first movement, are assumed, the relationship is such that the first and second colors constitute the same color, or the first color is of a color that is more achromatic.

It is preferable that a direction of movement of the second original image from the first original image is calculated based on the first and second frame video data. It is also preferable that the pixel in the part of the second driving image and the pixel in the part of the third driving image is determined based on the direction of movement.

With this embodiment, the second and third driving images may be generated in an appropriately according to the direction of movement of the first and second frame video data.

Further, an aspect of the invention may be constituted as an image display device that is equipped with any of the above mentioned image data processing devices and image display devices.

The present invention is not limited to being embodied in a device such as the image data processing device, image display device, or image display system described above, but may also be reduced to practice as a method, such as a method of image data processing. In addition, it is also possible to embody the invention as a computer program for realizing the method or device; a recording medium for recording such computer program; or data signal including the above-described computer program and embodied within a carrier wave.

Further, in cases in which the aspect of the invention is constituted as a computer program, or as a recording medium for recording such computer program, the invention may constitute an entire program for controlling the actions of the above-described device, or it may merely constitute portions for accomplishing the functions of the aspects of the invention. Moreover, various other media capable of being read by a computer may be utilized as recording media, such as flexible disks or CD-ROM, DVD-ROM/RAM, magnetooptical disks, IC cards, ROM cartridges, punch cards, printed matter with bar codes or other marks, computer internal memory devices (memory such as RAM, ROM), external memory devices, etc.

These and other objects, features, aspects, and advantages of the present invention will become more apparent from the following detailed description of the preferred embodiments with the accompanying drawings.

DESCRIPTION OF EXEMPLARY EMBODIMENT

A. Embodiment 1

A1. Overall Composition of the Image Display System

Figure 1:
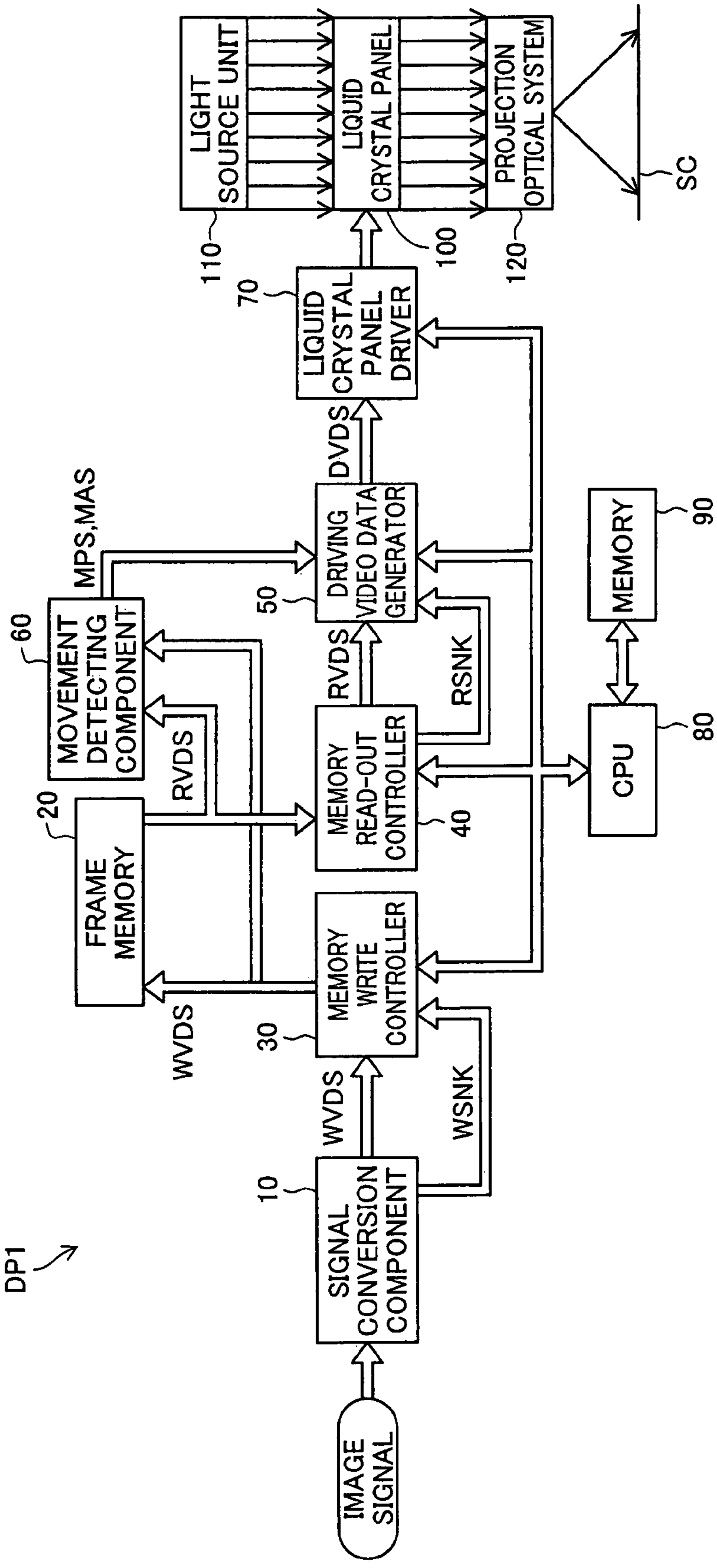
FIG. 1 is a block diagram that shows the constitution of the image display device, in which an image data processing device is applied, according to the first embodiment of the invention.

FIG. 1 is a block diagram showing the composition of an image display device implemented in an image data processing device as a first embodiment of the invention. As an image data processing device, this image display device DP1 constitutes a computer system equipped with a signal conversion component 10, a frame memory 20, a memory write controller 30, a memory read-out component 40, a driving video data generator 50, a movement detecting component 60, a liquid crystal panel driver 70, a CPU 80, a memory 90 and a liquid crystal panel 100. In addition, the image display device DP1 is equipped with various peripheral devices that are generally provided to computers, such as external memory devices and interfaces; however, these have been eliminated from FIG. 1 for the sake of simplicity.

The image display device DP1 is a projector. In the image display device DP1, light emitted from a light source unit 110 is converted into light for displaying an image (image light) by means of the liquid crystal panel 100. This image light is then imaged onto a projection screen SC by means of a projection optical system 120, and the image is projected onto the projection screen SC. The liquid crystal driver 70 can also be regarded not as an image data processing device, but rather as a block included within the image display device together with liquid panel 100. Each component part of the image display device DP1 is sequentially described below.

Through loading the control program and processing conditions recorded in the memory 90, the CPU 80 controls the actions of each block.

The signal conversion component 10 constitutes a processing circuit for converting image signals input from an external source into signals which can be processed by the memory write controller 30. For example, in cases in which image signals input from an external source are analog image signals, the signal conversion component 10 synchronizes with the synchronous signal included within the image signal, and converts the image signal into a digital image signal. Additionally, in cases in which image signals input from an external source are digital image signals, the signal conversion component 10 transforms the image signal into a form of signal which can be processed by the memory write controller 30, according to the type of image signal.

The digital image signal output from the signal conversion component 10 contains the video data WVDS of each frame. The memory write controller 30 sequentially writes the video data WVDS into the frame memory 20, synchronizing with the sync signal WSNK (write sync signal) for write use corresponding to the image signal. Further, write vertical synchronous signals, write horizontal synchronous signals, and write clock signals are included within the write synchronous signal WSNK.

The memory read-out controller 40 generates a synchronous signal RSNK (read synchronous signal) for read use based on read control conditions provided from the memory 90 via the CPU 80. The memory read-out controller 40, in sync with the read-out synchronous signal RSNK, reads the image data stored in frame memory 20. The memory read-out controller 40 subsequently outputs read-out video data signal RVDS and read-out synchronous signal RSNK to the driving video data generator 50.

Further, read vertical synchronous signals, read horizontal synchronous signals, and read clock signals are included within read-out synchronous signal RSNK. In addition, the cycle of read vertical synchronous signal RSNK has been established to be double that of the frequency (frame rate) of the write vertical synchronous signal WSNK of the image signal written in frame memory 20. Therefore, memory read-out controller 40, in sync with the read-out synchronous signal RSNK, twice reads image data stored in frame memory 20 within 1 frame cycle of the image signal written in frame memory 20, and outputs this to driving video data generator 50.

Data which is read the first time from the frame memory 20 by the memory read-out controller 40 is called first field data. Data which is read the second time from the frame memory 20 by memory read-out controller 40 is called second field data. Image signals within the frame memory 20 are not overwritten between first and second reads; therefore, the first field data and the second field data are the same.

The driving video data generator 50 is supplied with read-out video data signal RVDS and read-out synchronous signal RSNK from memory read-out controller 40. In addition, the driving video data generator 50 is supplied with a mask parameter signal MPS from the movement detecting component 60. The driving video data generator 50 then generates a driving video data signal DVDS based on the read-out video data signal RVDS, the read-out synchronous signal RSNK, and the mask parameter signal MPS; and outputs this to the liquid crystal panel driver 70. The driving video data signal DVDS is a signal used to drive the liquid crystal panel 100 via the liquid crystal panel driver 70. The composition and actions of the driving video data generator 50 are described further below.

The movement detecting component 60 makes a comparison between each frame of video data (also called "frame video data" below) WVDS, sequentially written by the memory write controller 30 into the frame memory 20 in sync with the write synchronous signal WSNK, and the read-out video data RVDS read by the memory read-out controller 40 from the frame memory 20 in sync with the read-out synchronous signal RSNK. Then, based on the frame video data WVDS and the read-out video data RVDS, the movement detecting component 60 detects the movement of both images of the frame video data WVDS and the read-out video data RVDS, and calculates the amount of movement. In addition, the read-out video data RVDS constitutes the video data that is one frame prior to the frame video data WVDS targeted for the comparison. The movement detecting component 60 determines the mask parameter signal MPS, according to the calculated amount of movement. The movement detecting component 60 then outputs the mask parameter signal MPS to the driving video data generator 50. The composition and actions of the movement detecting component 60 are described further below.

The liquid crystal panel driver 70 converts the driving video data signal DVDS supplied from the driving video data generator 50 into a signal that can be supplied to liquid crystal panel 100, and supplies this signal to the liquid crystal panel 100.

The liquid crystal panel 100 emits image light, according to the driving video data signal supplied from the liquid crystal panel driver 70. As stated earlier, this image light is projected onto the projection screen SC, and the image is displayed.

A2. Composition and Actions of the Movement Detecting Component

Figure 2:
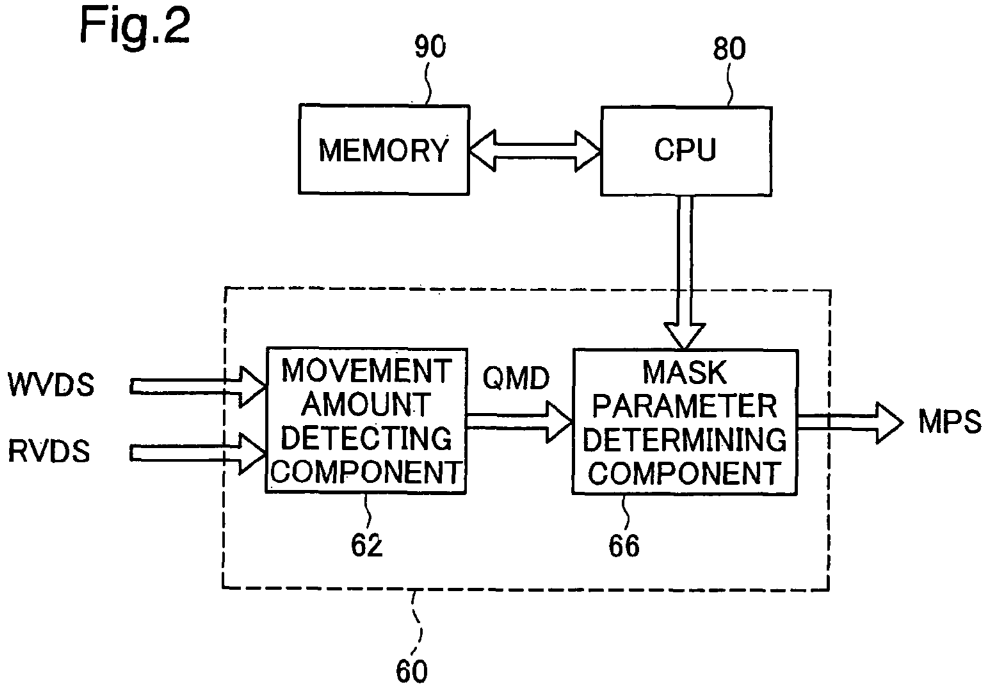
FIG. 2 is a summary block diagram that shows one example of the constitution of the movement detecting component 60.

FIG. 2 is an abbreviated block diagram showing one example of the composition of the movement detecting component 60 (see FIG. 1). The movement detecting component 60 is equipped with a movement amount detecting component 62 and a mask parameter determining component 66.

The movement amount detecting component 62 respectively divides the frame video data (target data) WVDS written into the frame memory 20, and the frame video data (reference data) read from the frame memory 20, into rectangular image blocks of p×q pixels (p, q are integers that are equal to or greater than 2). The movement amount detecting component 62 then obtains the image movement vector for the pair of each block, based on the block that corresponds to these two frames of image data. The size of this movement vector constitutes the amount of movement of each block pair. The sum total of the amount of movement of each block pair constitutes the volume of image movement between the two frames.

It is possible to easily obtain the movement vector for each block pair, by, for example, obtaining the amount of movement of the center of gravity coordinate of the image data (brightness data) included within the block. "Pixel/frame" may be utilized as the unit for the amount of movement of the center of gravity coordinate. Because various general methods may be utilized as methods for obtaining the movement vector, their detailed explanation is omitted here. The obtained amount of movement is supplied as the movement amount data QMD from the movement amount detecting component 62 to the mask parameter determining component 66.

The mask parameter determining component 66 determines the value of the mask parameter MP, according to the movement amount data QMD supplied from the movement amount detecting component 62. Data showing the determined mask parameter MP value is output as mask parameter signal MPS from the movement detecting component 60 to the driving video data generator 50 (see FIG. 1).

Table data is stored in advance within the mask parameter determining component 66. The table data shows image a plurality of movement amount Vm related with normalized value of mask parameter MP. These table data are read from the memory 90 by the CPU 80, and are supplied to the mask parameter determining component 66 of movement detecting component 60 (see FIGS. 1 and 2). The mask parameter determining component 66 refers to this table data, and determines the mask parameter MP value according to the amount of movement shown by the supplied movement amount data QMD. In addition, although the first embodiment is in a form that utilizes table data, it may be constituted so as to be in a form in which the mask parameter MP is obtained from the movement amount data QMD by means of function computations with polynomials.

Figure 3:
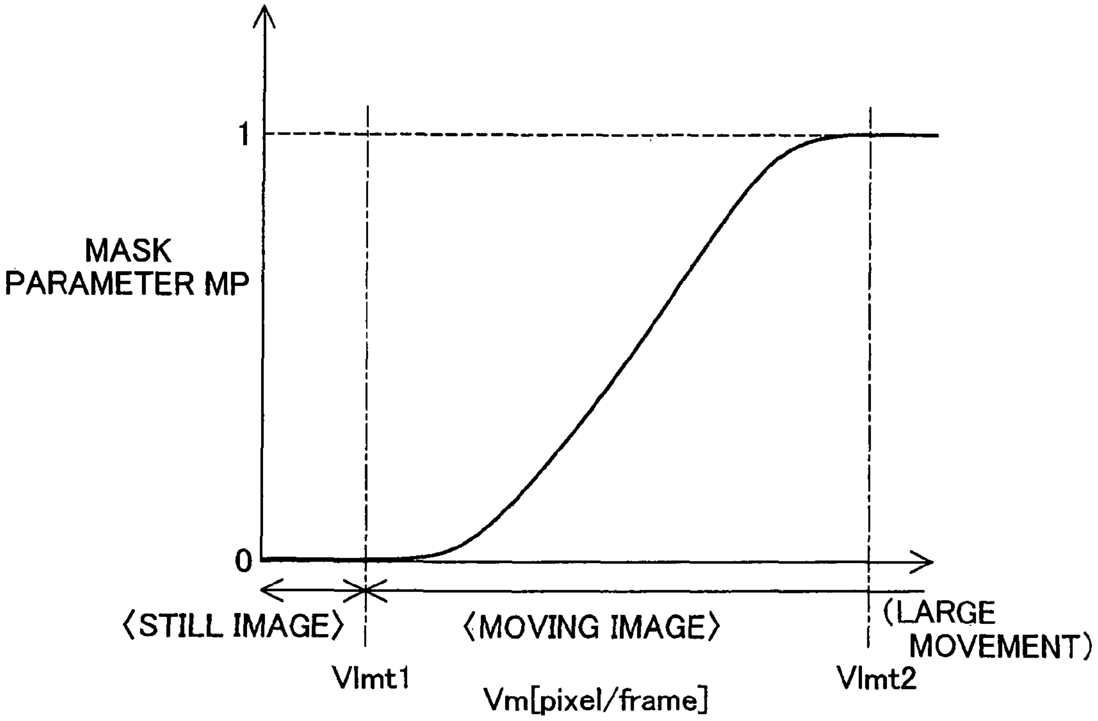
FIG. 3 shows the table data housed within the mask parameter determining component 66.

FIG. 3 shows the table data stored within the mask parameter determining component 66. As shown in FIG. 3, these table data show the characteristics of the mask parameter MP value (0 to 1) in relation to the movement amount Vm. Movement amount Vm is shown as the number of moving pixels in frame units, or in other words, the speed of movement in "pixel/frame" units. Image movement when reproducing the image becomes larger as the size of the movement amount Vm increases. Consequently, in a fixed frame rate, generally speaking, smoothness of the moving image becomes impaired as the movement amount Vm increases.

According to the table data in FIG. 3, in cases when the movement amount Vm is equal to or less than the threshold value Vlmt1, the mask parameter MP value is 0. In cases where the movement amount Vm is equal to or less than the threshold value Vlmt, it can be regarded that there is no image movement between blocks corresponding to the frame video data (target data) WVDS and the frame video data (reference data) RVDS. In such cases, as is stated hereafter, mask data in which the image is displayed as achromatic is generated.

On the other hand, in cases where the movement amount Vm exceeds the threshold value Vlmt2, the mask parameter MP value is 1. As is stated hereafter, mask data that shows the complementary colors of the colors of each pixel of the read-out video data signal RVDS1 are generated.

Moreover, according to the table data in FIG. 3, in cases when the movement amount Vm exceeds the threshold value Vlmt1 but is equal to or less than the threshold value Vlmt2, the mask parameter MP value falls in a range between 0 and 1. As a general trend, the values are set so that the greater the movement amount Vm becomes, the closer the mask parameter MP value approximates 1; the smaller the movement amount Vm becomes, the closer the mask parameter MP value approximates 0. In addition, the table data may partially contain a range in which the mask parameter MP is constant even when movement amount Vm differs. When movement amount Vm exceeds the threshold value Vlmt1, this indicates that there is image movement between the blocks corresponding to the frame video data (target data) WVDS and the frame video data (target data) RVDS.

Further, in the present embodiment, the mask parameter determining component 66 is constituted as a portion of the movement detecting component 60 (see FIGS. 1 and 2). However, the mask parameter determining component 66 may be constituted not within the movement detecting component 60, but rather as a block included within the driving video data generator 50 (see FIG. 1), and in particular, as a block included within the mask data generator 530 stated hereafter.

It is also permissible for the movement detecting component 60 to be included in its entirety within the driving video data generator 50.

A3. Composition and Operation of the Driving Video Data Generator

Figure 4:
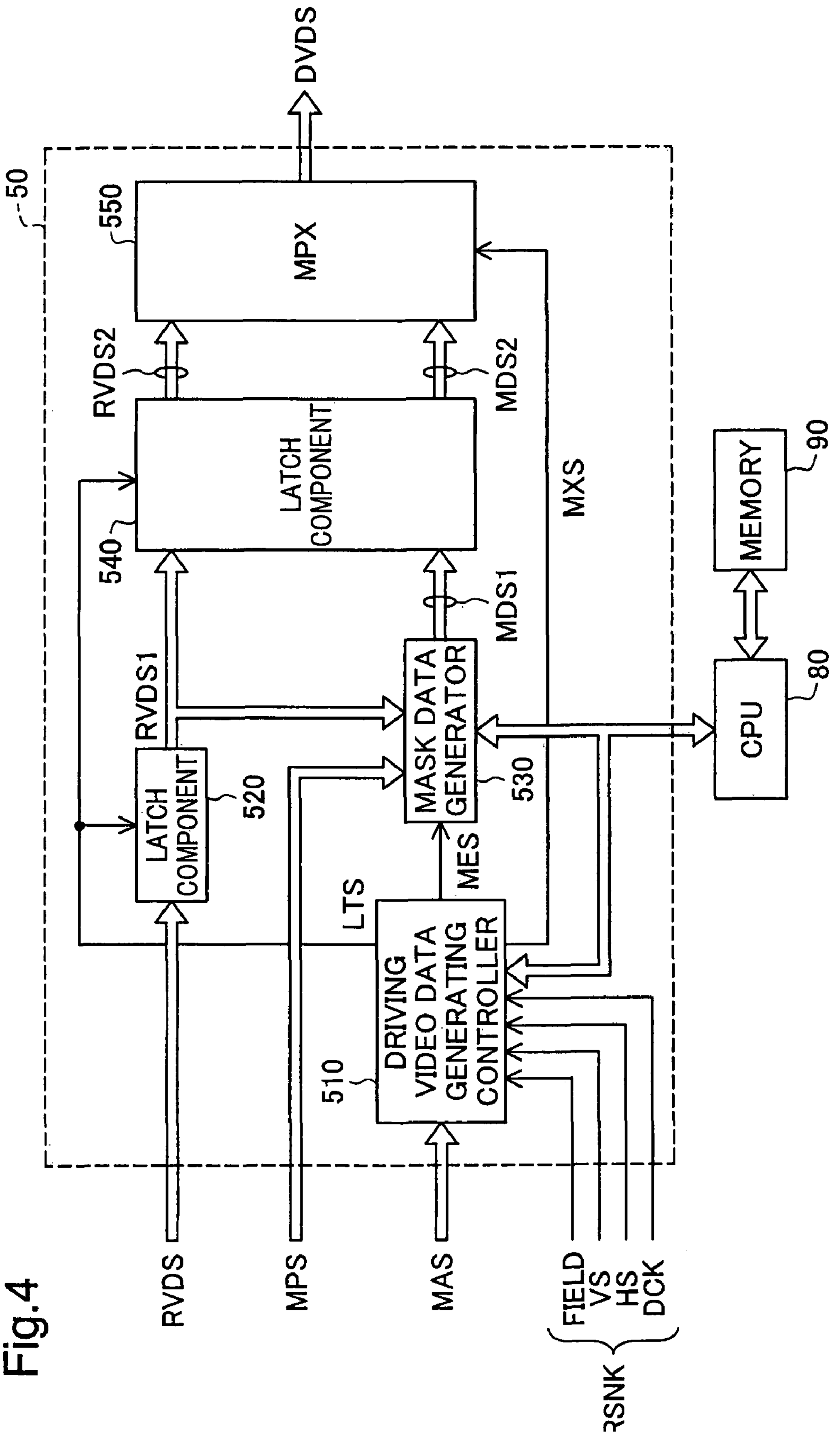
FIG. 4 is a summary block diagram that shows one example of the constitution of the driving video data generator 50.

FIG. 4 is an abbreviated block diagram showing one example of the composition of the driving video data generator 50 (see FIG. 1). The driving video data generator 50 is composed of a driving video data generating controller 510, a first latch component 520, a mask data generator 530, a second latch component 540, and a multiplexer (MPX) 550.

The driving video data generating controller 510 is supplied with the read-out synchronous signal RSNK from the memory read-out controller 40, as well as with the moving area data signal MAS from the movement detecting component 60 (see FIG. 1). The moving area data signal MAS also constitutes the signal that shows the area of movement of the target within the image. According to the first embodiment, all of the area within the image constitutes the area of movement of the target.

The driving video data generating controller 510 outputs a latch signal LTS, a selection control signal MXS, and an enable signal MES, based on a read vertical synchronous signal VS, a read horizontal synchronous signal HS, a read clock DCK, and a field selection signal FIELD contained within the read-out synchronous signal RSNK, as well as the moving area data signal MAS (see bottom right portion of FIG. 4).

The latch signal LTS is output from the driving video data generating controller 510 to the first latch component 520 and the second latch component 540, and controls their actions.

The selection control signal MXS outputs from the driving video data generating controller 510 to the multiplexer 550, and controls the actions of the multiplexer 550. The selection control signal MXS shows the position of the image, or the position (pattern) of the pixel for which the read-out image data are to be replaced with the mask data.

The enable signal MES is output to the mask data generator 530 from the driving video data generating controller 510, and controls the actions of the mask data generator 530. In other words, the enable signal MES constitutes a signal that directs the generation and non-generation of mask data. The driving video data generating controller 510 controls the driving video data signal DVDS by means of these signals.

In addition, the field selection signal FIELD, which is received by the driving video data generating controller 510 from the memory read-out controller 40, is a signal with the following characteristics. Specifically, the field selection signal FIELD shows whether the read-out video data signal RVDS (see FIG. 1), which is read from frame memory 20 by the memory read-out controller 40 and latched by the first latch component 520, constitutes the read-out image data signal of the first field that is read for the first time, or the read-out image data signal of the second field that is read for the second time.

The first latch component 520 sequentially latches the read-out video data signal RVDS supplied from the memory read-out controller 40, according to the latch signal LTS supplied from the driving video data generating controller 510. The first latch component 520 outputs the latched read-out image data, as a read-out video data signal RVDS 1 to the mask data generator 530 and the second latch component 540.

The mask data generator 530 is supplied the mask parameter signal MPS from the movement detecting component 60. The mask data generator 530 is also supplied the enable signal MES from driving video data generating controller 510. The mask data generator 530 is further supplied the read-out Video data signal RVDS1 from the first latch component 520. In case where the generation of mask data is allowed by the enable signal MES, the mask data generator 530 generate mask data based on the mask parameter signal MPS and the read-out video data signal RVDS1. The mask data generator 530 outputs the generated mask data to the second latch component 540 as a mask data signal MDS1.

The mask data shows the pixel value, according to the pixel value of each pixel included within the read-out video data RVDS1. More specifically, the mask data constitutes pixel values that show the complementary colors of each pixel included within the read-out video data RVDS1, or the colors obtained by the mixing of complementary and achromatic colors. Also, "pixel value" refers to the parameters that indicate the colors of each pixel. In the present embodiment, the read-out video data signal RVDS1 is designed to contain color information concerning each pixel as a combination of pixel values indicating the intensity of red (R), green (G), or blue (B) (tone values 0 to 255). Below, these red (R), green (G), or blue (B) tone value combinations are referred to as "RGB tone values."

Figure 5:
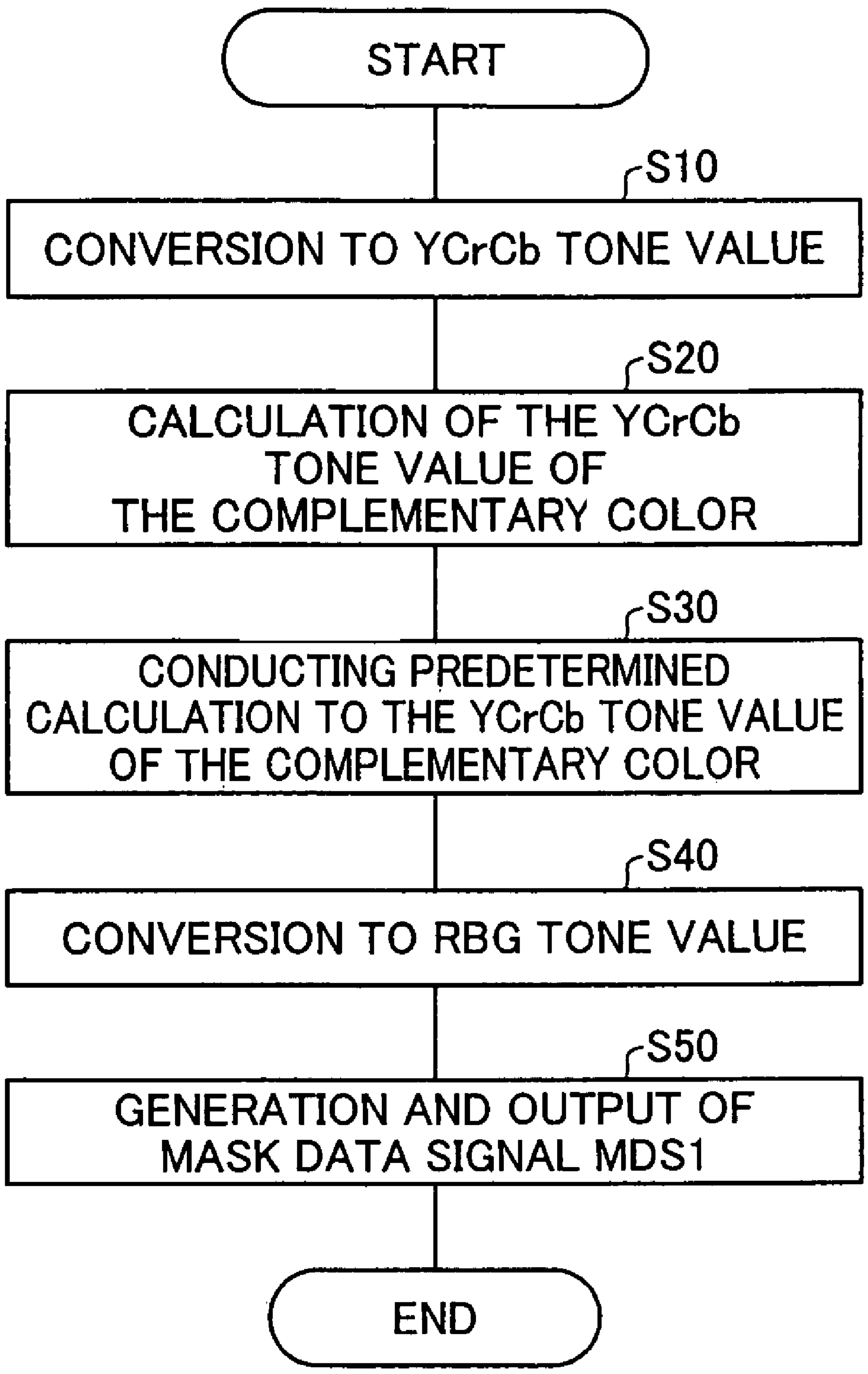
FIG. 5 is a flowchart that shows the details of image processing relative to the mask data generator 530.

FIG. 5 is a flowchart showing the details of image processing by the mask data generator 530. First, in Step S10, the mask data generator 530 converts the RGB tone value of the pixel to a tone value (Y, Cr, Cb) of the YCrCb color system. "Y" is the tone value that indicates brightness. "Cr" is the tone value that indicates red color difference (red-green component). "Cb" is the tone value that indicates blue color difference (blue-yellow component). These combinations of tone values are called "YCrCb tone values." Tone value conversion from RGB tone values to YCrCb tone values in Step S10 may, for example, be conducted by means of the following formula.

$$Y=(0.29891\times R)-(0.58661\times G)+(0.11448\times B) \tag{1}$$

$$Cr=(0.50000\times R)-(0.41869\times G)-(0.08131\times B) \tag{2}$$

$$Cb=-(0.16874\times R)-(0.33126\times G)+(0.50000\times B) \tag{3}$$

Additionally, the processes of Steps S10 to S40 of FIG. 5 are conducted for the pixel value of each pixel of the read-out video data signal RVDS1.

In Step S20, according to the following formulae (4) and (5), the mask data generator 530 inverts the signs of the Cr, Cb tone value obtained by formulae (1) to (3) above, thereby obtaining the tone value (Y, Crt, Cbt). Tone value (Y, Crt, Cbt) shows the complementary color of the color indicated by gradient color (Y, Cr, Cb).

$$Crt=-Cr \tag{4}$$

$$Cbt=-Cb \tag{5}$$

The color indicated by tone value (Y, Crt, Cbt) constitutes a color with the opposite values of both read and blue color differences, as the color shown by tone value (Y, Cr, Cb). Specifically, when the colors indicated by tone value (Y, Crt, Cbt) and tone value (Y, Cr, Cb) are mixed, Cr and Crt, as well as Cb and Cbt respectively cancel out one other, and the red-green component as well as the blue-yellow component both become 0. In other words, if the colors indicated by tone value (Y, Crt, Cbt) and tone value (Y, Cr, Cb) are mixed, the color becomes achromatic. A color with this kind of relationship relative to another color is called a "complementary color."

In Step S30 of FIG. 5, the mask data generator 530 conducts a calculation on tone value (Y, Crt, Cbt) by utilizing the mask parameter MP (0 to 1), thereby obtaining tone value (Yt2, Crt2, Cbt2). The mask data generator 530 receives mask data generating conditions, which is preliminarily set and stored within the memory 90, under the direction of the CPU 80. In Step S30, a calculation sccorfding to these mask data generating conditions is then conducted.

In the calculations conducted in Step S30, it is possible to utilize various calculations, such as, for example, multiplication, bit shift calculation, etc. In the present embodiment, multiplication (C=A×B) of tone values Crt, Cbt is established as the calculation conducted in step S30. Specifically, the formulae (6) to (8) below are followed to obtain tone value (Yt2, Crt2, Cbt2) from tone value (Y, Crt, Cbt).

$$Yt2=Y \quad (6)$$

$$Crt2=Crt\times MP \quad (7)$$

$$Cbt2=Cbt\times MP \quad (8)$$

In step S40 of FIG. 5, the mask data generator 530 reconverts the YCrCb tone value (Yt2, Crt2, Cbt2) obtained in the results of Step S30 to the RGB tone value (Rt, Gt, Bt). The tone value conversion of Step S40 may be conducted by, for example, the following formulas (9) to (11).

$$Rt=Y+(1.40200\times Crt) \quad (9)$$

$$Gt=Y-(0.34414\times Cbt)-(0.71414\times Crt) \quad (10)$$

$$Bt=Y+(1.77200\times Cbt) \quad (11)$$

In Step S50 of FIG. 5, the mask data generator 530 generates the image signal that includes the RGB tone value (Rt, Gt, Bt) of each pixel obtained in steps S10 to S40, and outputs this as the mask data signal MDS1 to the second latch component 540.

The mask data generator 530, as described above, conducts color conversion in regards to the read-out video data signal RVDS1, generates image data signal MDS1, and supplies this to the second latch component 540 (see FIG. 4). Through this means, for each pixel of images indicated by the read-out video data RVDS1, which are output by the first latch component 520, mask data are generated according to the amount of movement, based on the read-out image data of each pixel.

For example, in cases in which the value of the mask parameter MP is 0, both "red-green component" Crt2 and "blue-yellow component" Cbt2 are both 0, according to formulas (7) and (8). Consequently, the colors of each pixel of the mask data are achromatic. In addition, in cases in which the value of the mask parameter MP is 1, Crt2=−Cr, Cbt2=−Cb, according to formulas (7) and (8). Therefore, mask data indicating complementary colors (Y, −Cr, −Cb) of the colors of each pixel of read-out video data signal RVDS1 are generated.

Additionally, when mask parameter MP assumes a value that is greater than 0 and less than 1, the color of each pixel of the mask data possesses the same level of brightness as the brightness of the colors of each pixel of the read-out video data signal RVDS1. The signs of the "red-green component" colors of the pixels of the mask data then become the opposite of those of the "red-green component" colors of the pixels of the read-out video data signal RVDS1, and the absolute value becomes a smaller value. The signs of the "blue-yellow component" colors of the pixels of the mask data also become the opposite of those of the "blue-yellow component" colors of the pixels of the read-out video data signal RVDS1, and the absolute value becomes a smaller value. The saturation of such colors are reduced as compared with the "complementary colors" of the read-out video data signal RVDS1.

The above-described colors lie between the complementary colors of the colors of the pixels of the read-out video data signal RVDS1, and grey having a level of brightness that is the same as that of the colors of the pixels of the read-out video data signal RVDS1. Specifically, the colors of the pixels of the mask data are obtainable by mixing the complementary colors of the pixels of the read-out video data signal RVDS1 with achromatic colors of a prescribed brightness, at a predetermined proportion.

The second latch component 540 of FIG. 4 receives the latch signal LTS supplied from the driving video data generating controller 510, the read-out video data signal RVDS1 supplied from the first latch component 520, and the mask data signal MDS1 supplied from the mask data generator 530. The second latch component 540 sequentially latches the read-out video data signal RVDS1 and the mask data signal MDS1 in accordance with the latch signal LTS. The second latch component 540 then outputs the latched read-out video data to the multiplexer 550 as the read-out video data signal RVDS2. Further, the second latch component 540 outputs the latched mask data to the multiplexer 550 as a mask data signal MDS2.

The multiplexer 550 receives read-out video data signal RVDS2 and the mask data signal MDS2 supplied from the second latch component 540. In addition, the multiplexer 550 receives the selection control signal MXS supplied from the driving video data generating controller 510. The multiplexer 550 selects either the read-out video data signal RVDS2, or the mask data signal MDS2, in accordance with the selection control signal MXS. The multiplexer 550 then generates a driving video data signal DVDS, based on the selected signal, and outputs this to the liquid crystal panel driver 70 (see FIG. 1).

In addition, the selection control signal MXS is generated by driving video data generating controller 510, based on the field signal FIELD, the read-out vertical synchronous signal VS, the read-out horizontal synchronous signal HS, and the read-out-clock DCK, so that the pattern of the mask data configured by replacement with the read-out image data may constitute a predetermined mask pattern as a whole (see FIG. 4).

Figure 6:
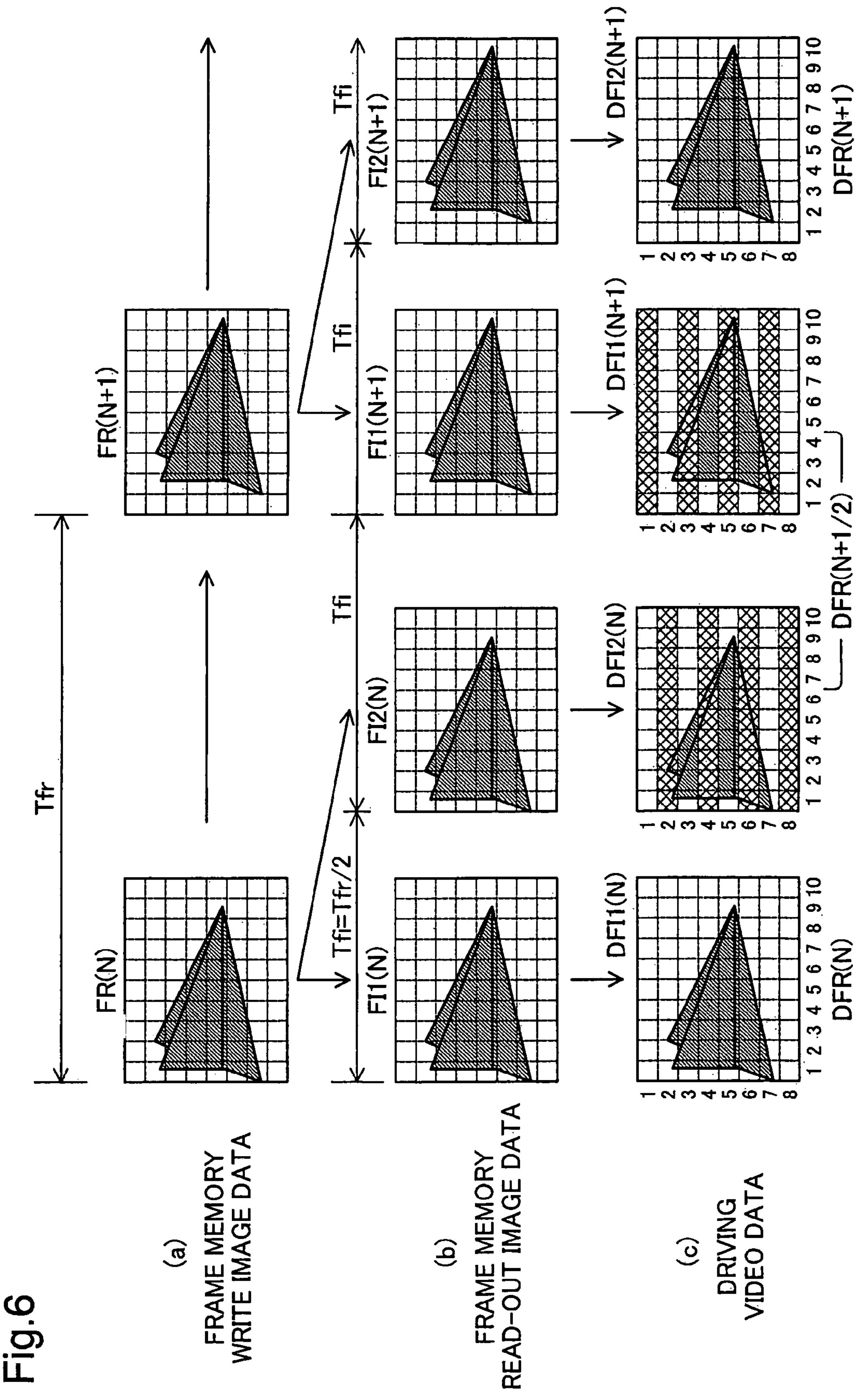
FIG. 6 shows the generated driving video data.

FIG. 6 is an explanatory figure that shows the driving video data generated by the multiplexer 550. As shown in the row (a) of FIG. 6, the frame video data of each frame is stored within the frame memory 20 by means of the memory write controller 30 between fixed cycles (frame cycles) Tfr. The row (a) of FIG. 6 shows an example of cases in which the frame video data FR (N) of an Nth frame (referred to below simply as "#N frame"), as well as frame video data FR (N+1) of an (N+1) th frame (referred to below simply as "#(N+1) frame") are consecutively stored in the frame memory 20. Moreover, in cases where the 1st frame is designated as the lead frame, N is an odd number equal to/greater than 1. In cases where the zero frame is designated as the lead frame, N is an even number, including 0.

At this time, as mentioned previously, the frame video data stored in the frame memory 20 are read twice at cycle speed (field cycle) Tfi, equivalent to double the cycle speed of frame cycle Tfr (see FIG. 1). Then, as shown in the row (b) of FIG. 6, the read-out image data FI1 corresponding to the first field and read-out image data FI2 corresponding to the second field are sequentially output to driving video data generator 50. The row (b) of FIG. 6 illustrates by example cases in which the read-out image data FI1 (N) of the first field and the read-out image data FI2 (N) of the second field of the Nth frame, followed by the read-out image data FI1 (N+1) of the first field and the read-out image data FI2 (N+1) of the second field of the N+1 frame, are sequentially output.

Then, in the driving video data generator 50 (FIG. 4), as shown in the row (c) of FIG. 6, generation of driving video data is executed per each (paired) group of two frame images of consecutive odd and even numbers. FIG. 6(*c*) shows driving video data DFI1 (N), DFI2 (N), DFI1 (N+1), and DFI2 (N+1), generated in response to consecutive #N frame and #(N+1) frame groups.

The read-out image data FI1 (N) of the first field corresponding to the #N frame and read-out image data FI2 (N+1) of the second field corresponding to the #(N+1) frame constitute the driving video data DFI1 (N) and DFI2 (N+1) as is (see the columns on the left and right edges of FIG. 6).

On the other hand, the read-out image data FI2 (N) and FI1 (N+1), on the boundary of the #N and #(N+1) frames (see the row (b) of FIG. 6), are modified by the calculation process of the mask data generator 530, as well as the selection process of the multiplexer 550.

More specifically, the even-numbered horizontal lines (shown by the crosshatching in the row (c) of FIG. 6) of the read-out image data FI2 (N) of the second field corresponding to the #N frame are replaced with the mask data. Consequently, driving video data DFI2 (N) are generated. Also, the odd-numbered horizontal lines (shown by the crosshatching in the row (c) of FIG. 6) of the read-out image data FI1 (N+1) of the first field corresponding to the #(N+1) frame are replaced with the mask data. As a result, driving video data DFI1 (N+1) is generated.

The odd-numbered horizontal lines of the read-out image data FI2 (N) may be replaced with the mask data to generate driving video data DFI2 (N); and the even-numbered horizontal lines of read-out image data FI1 (N+1) may be replaced with the mask data to generate driving video data DFI1 (N+1).

Further, for the sake of clarity, the image shown by the driving video data in FIG. 6 shows the image of one frame with 8 horizontal lines and 10 vertical lines. Consequently, the driving video data DFI2 (N) and DFI1 (N+1) in the row (c) of FIG. 6 appear as a scattered image. However, in actuality, even though the mask data are placed in every other horizontal line in the driving video data, these hardly stand out at all to the human eye. This is because the actual image contains several hundred or more horizontal and vertical lines.

Figure 7:
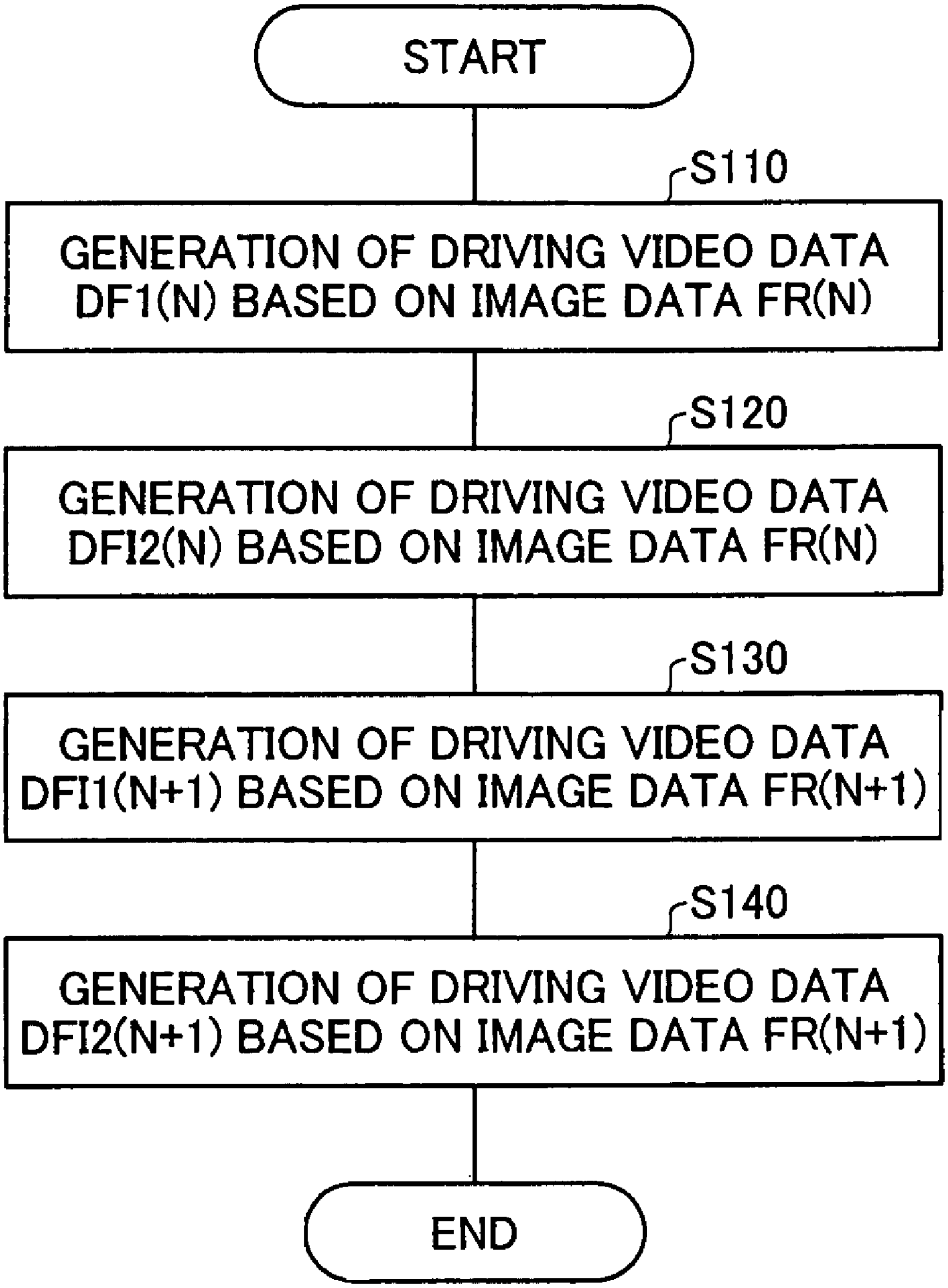
FIG. 7 is a flowchart that shows the details of processing to generate driving video data DFI1 (N) to DFI2 (N+2), according to the driving video data generator 50.

FIG. 7 is a flowchart that shows the details of the process for generating driving video data DFI1 (N), DFI2 (N), DFI1 (N+1), and DFI2 (N+2), in the multiplexer 550 of driving video data generator 50. The process of the multiplexer 550 explained above may be organized as indicated below. Specifically, the driving video data DFI1 (N) is generated based on the frame video data FR (N) in Step S110 (see the column on the left edge of FIG. 6). The driving video data DFI2 (N) is generated based on the frame video data FR (N) in Step S120 (see the second column from the left edge of FIG. 6). The driving video data DFI1 (N+1) is generated based on the frame video data FR (N+1) in Step S130 (see the second column from the right edge of FIG. 6). The driving video data DFI2 (N+1) is generated based on the frame video data FR (N+1) in Step S140 (see the column on the right edge of FIG. 6).

The video data signal DVDS (see FIG. 1), output from the driving video data generator 50 to the liquid crystal panel driver 70, specifies consecutive display of images of the driving video data DFI1 (N), DFI2 (N), DFI1 (N+1), and DFI2 (N+2), in that order, based on the frame video data FR (N) and FR (N+1), within an Nth number of 2 frame cycles (TfrX2; see FIG. 6(*c*)). Herein, N is an odd number equal to or greater than 1, or an even number that includes 0. The liquid crystal panel 100 is controlled by the liquid crystal panel driver 70, based on the driving video data signal DVDS, and the moving image is displayed on the projection screen SC (see FIG. 1).

The image DFR (N) of driving video data DFI1 (N) constitutes the image of the frame video data FR (N) (see the left side of FIG. 6). The image DFR (N+1) of driving video data DFI2 (N+1) constitutes the image of the frame video data FR (N+1) (see the right side of FIG. 6).

As opposed to this, the image of the driving video data DFI2 (N) constitutes the image that has replaced the image of the frame video data FR (N) partly, for example, the even-numbered horizontal line image, with the image of the mask data. The image of driving video data DFI1 (N+1) then constitutes the image that has replaced the image of the frame video data FR (N+1) partly, for example, the odd-numbered horizontal line image, with the image of the mask data.

When the moving image is reproduced, based on output of the video data signal DVDS from the driving video data generator 50 to the liquid crystal panel driver 70, the images of driving video data DFI2 (N) and of driving video data DFI1 (N+1) are consecutively displayed. As a result, the images of driving video data DFI2 (N) and of driving video data DFI1 (N+1) appear as a single synthesized image DFR (N+½) to persons viewing projection screen SC.

In the image DFR (N+½), the color of each pixel of the even-numbered horizontal lines appears as the color obtained as a result of a mixture of the color of the mask data of each pixel of the even-numbered horizontal lines of the driving video data DFI2 (N), and of the color of each pixel of the even-numbered horizontal lines of the driving video data DFI1 (N+1). Additionally, in the image DFR (N+½), the color of each pixel of the odd-numbered horizontal lines is seen as the color obtained as a result of a mixture of the color of each pixel of the odd-numbered horizontal lines of the driving video data DFI2 (N), and of the color of the mask data of each pixel of the odd-numbered horizontal lines of the driving video data DFI1 (N+1).

In the mask data, the color of each pixel is generated based on the complementary color of the color of the pixel corresponding to the read-out video data signal RVDS1 (see step S20 in FIG. 5). The tone value of the color of each pixel of the mask data is determined by multiplying the tone value that shows the complementary color of the pixel color, by a coefficient MP equal to or less than 1 (see Step S30 in FIG. 5). Accordingly, the saturation of the color of each pixel of the mask data is lower than that of the complementary color of the pixel color. Therefore, in the image DFR (N+½), which is visible to the human eye, as a result of the partly offsetting of the color of each pixel by the complementary color of the mask data, the color appears more achromatic as compared with the color of the pixels corresponding to DFR (N) and DFR (N+1).

Specifically, the image DFR (N+½) possesses an intermediate pattern between that of the image DFR (N) of frame video data FR (N) and that of the image DFR (N+1) of frame video data FR (N+1), in which the saturation of each pixel is lower than those of the images of the image DFR (N) and the image DFR (N+1). IN case where the mask parameter MP is 1 (see FIG. 3), the color of each pixel in the mask data constitutes the complementary color of the pixel corresponding to read-out video data signal RVDS1, and is not caused to approximate an achromatic color (see formulae (7) and (8)).

In the present embodiment, when reproducing operations are conducted based on the video data signal DVDS, an image DFR (N+½) of a color brought into approximation with the above-described achromatic color is visible between the image DFR (N) of the frame video data FR (N) and the image DFR (N+1) of the frame video data FR (N+1; see the row (c) of FIG. 6). Consequently, it becomes difficult for the viewer to detect blurring of the moving image, as compared with cases in which the image DFR (N) and the image DFR (N+1) are directly switched during viewing.

In addition, in the present embodiment, the color of the mask data of the pixel of the driving video data DFI2 (N) is generated based on the complementary color of the pixel of the driving video data DFI1 (N), and the color of the mask data of the pixel of the driving video data DFI1 (N+1) is generated based on the complementary color of the pixel of the driving video data DFI2 (N+1). Therefore, the remaining image can be more effectively negated, as opposed to constitutions that simply darken the color of adjacent pixels of the driving video data DFI1 (N) or DFI2 (N+1), or constitutions that utilize a monochromatic mask (black, white, grey, etc.).

Moreover, in case where the remaining image is strongly negated by utilizing a monochromatic black or grey mask, it has been necessary to utilize a mask that is close to black in color. As a result, there has been a risk that the screen will become dark. However, in the present embodiment, because the complementary color can be effectively utilized to negate the remaining image, the actual occurrence of such darkening of the screen is preventable.

In the present embodiment, the driving video data DFI2 (N) and the driving video data DFI1 (N+1) images both constitute images in which portions (i.e. every other horizontal line) have been replaced with the mask data. The horizontal lines are formed with an extremely high density. Consequently, in cases where the viewer sees each and every image, the viewer is able to visually confirm the target within the image in which slightly different images are shown in the alternate lines. In the present embodiment, it is not the case that monochromatic images that are entirely black, white or grey (achromatic) are inserted into the intervals of the frame images. Consequently, by means of the present embodiment, moving images may be reproduced in which it is difficult for the viewer to detect any flickering.

A4. Driving Video Data Modification Examples

A4.1 Modification Example 1

In the embodiment described above, as shown in FIG. 6, an exemplary case is explained in which the read-out image data and the mask data are alternately positioned on each of the horizontal lines. However, it is also permissible for the read-out image data and the mask data to be alternately positioned at every m-th number (m being an integer equal to or greater than 1) of horizontal lines. With this constitution as well, it is possible to reduce image blurring and flickering in reproducing the image.

A4.2 Modification Example 2

Figure 8:
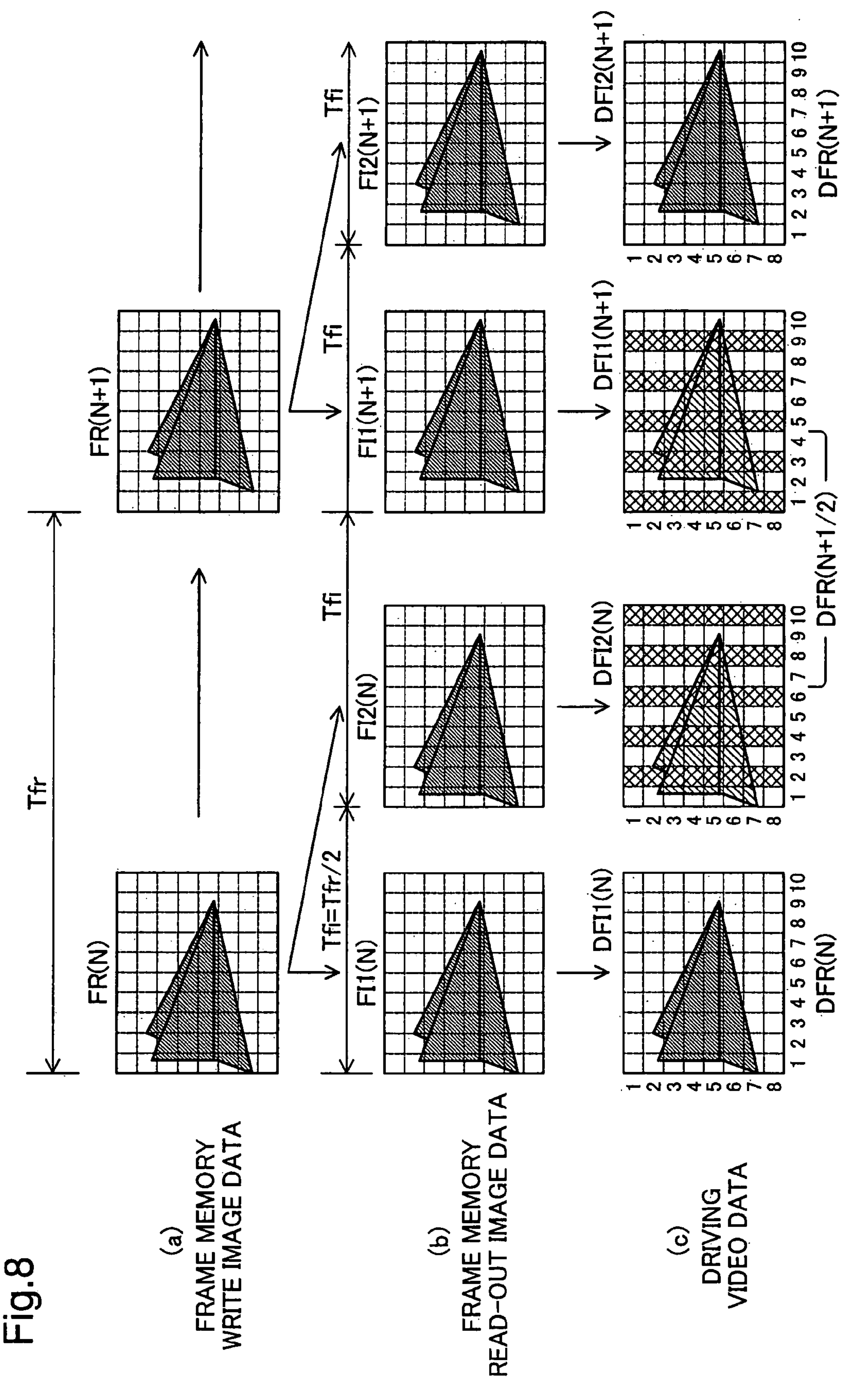
FIG. 8 shows Modification Example 2 of the generated driving video data.

FIG. 8 shows the second variation of the generated driving video data. In the second variation, as shown in FIG. 8, in driving video data DFI2 (N) corresponding to the second field of #N frame, the data of each pixel forming vertical lines of even numbers (shown by a crosshatch in the row (c) of FIG. 8 are replaced with the mask data; and in driving video data DFI1 (N+1) corresponding to the first field of #(N+1) frame, the data of each pixel forming vertical lines of odd numbers (shown by a crosshatch in the row (c) FIG. 8 are replaced with the mask data.

Further, the odd-numbered horizontal lines in the driving video data DFI2 (N) may be replaced with the mask data, and even-numbered horizontal lines in driving video data DFI1 (N+1) may be replaced with the mask data.

Also in the present modification example, due to the nature of human vision to see a remaining image, interpolation image DFR (N+½) is sensed by the viewer, by means of the image of the second driving video data DFI2 (N) of the #N frame, as well as the image of the first driving video data DFI1 (N+1) of the #(N+1) frame. In reproducing moving images in this manner, it is possible to reduce moving image blur and flicker (screen flicker), as compared with cases in which the frame video data FR (N) and frame video data FR (N+1) are continuously displayed.

In particular, in cases as in the present modification example, when read-out image data corresponding to the pixels forming the vertical lines are replaced with the mask data, the reduction of image blurring and flickering with respect to movement, including movement in the horizontal direction, is more effectively accomplished, as compared with the replacement of read-out image data corresponding to the horizontal lines with the mask data, as is the case with the embodiment. However, with respect to the movement including movement in the vertical direction, the first embodiment is more effective.

A4.3 Modification Example 3

The second modification example described a case in which read-out image data and mask data are alternately positioned on each of the vertical lines. However, it is also permissible for the read-out image data and the mask data to be alternately positioned at every n-th number (n being an integer equal to or greater than 1) of vertical lines. In such cases, as in the second modification example, the interval between the two frames can be interpolated in an effective manner through utilizing the nature of human vision. Consequently, in reproducing moving images, it is possible to reduce the blurring and flickering of such images, and to make the viewer feel that the images are moving in a smooth manner. In the present variation, the reduction of image blurring and flickering is particularly effective with respect to movement in the horizontal direction.

A4.4 Modification Example 4

Figure 9:
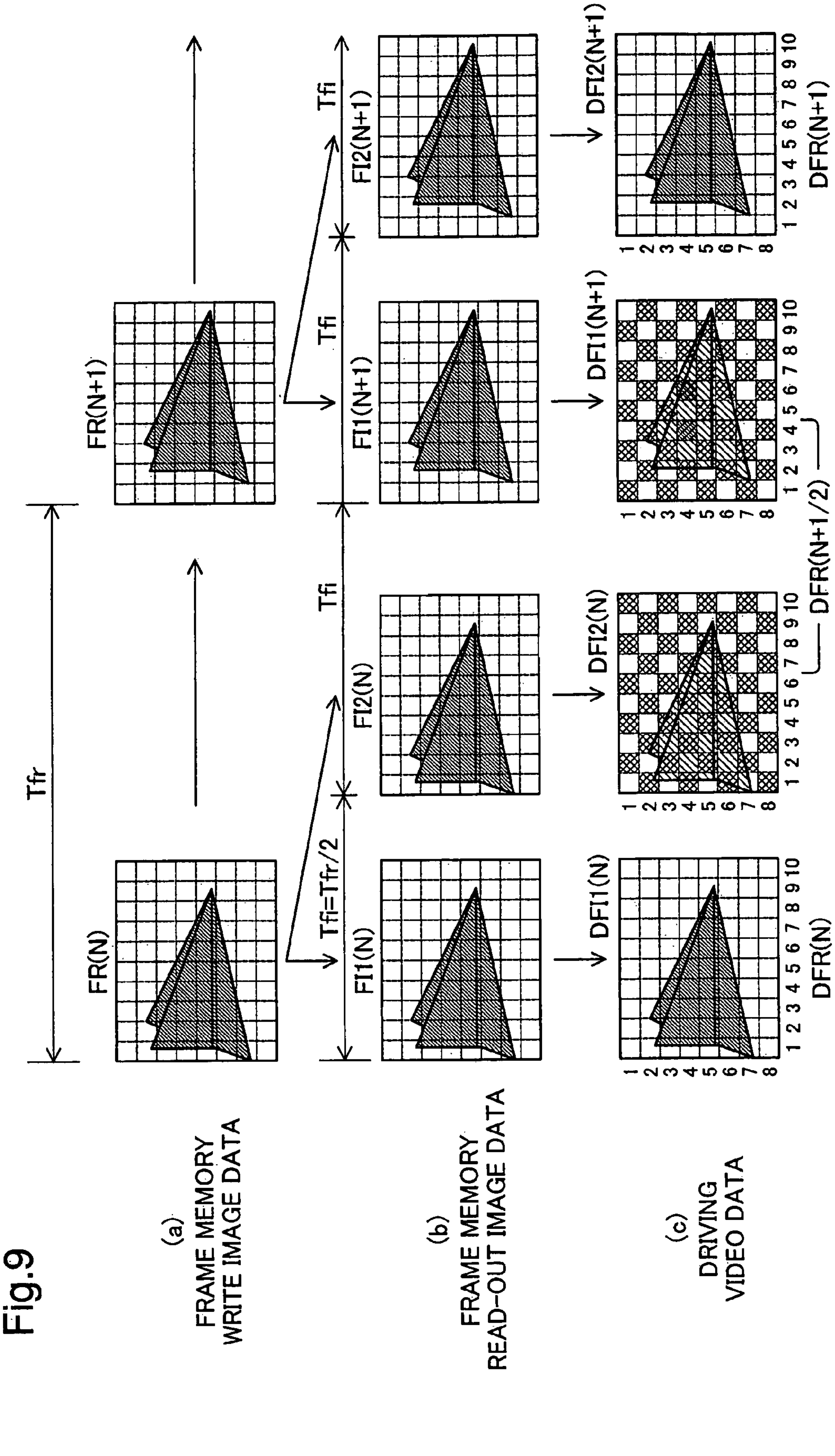
FIG. 9 shows Modification Example 4 of the generated driving video data.

FIG. 9 is an explanatory figure that shows a fourth modification example of the generated driving video data. As shown in the row (c) of FIG. 9, mask data and read-out image data, within the driving video data DFI2 (N) corresponding to the second field of #N frame and within the driving video data DFI1 (N+1) corresponding to the first field of #(N+1) frame, are alternately positioned in each pixel of the pixels lined up in the horizontal and vertical directions. In FIG. 9, read-out image data pixels that have been replaced with the mask data are indicated by crosshatching. The configured positions of the mask data and read-out image data are mutually complementary, when comparing the driving video data DFI2 (N) with driving video data DFI1 (N+1).

Moreover, in the example in FIG. 9, with respect to driving video data DFI1 (N), the read-out image data is replaced with the mask data in regards to the even-numbered pixels for odd-numbered horizontal lines, as well as odd-numbered pixels for even-numbered horizontal lines. However, with driving video data DFI2 (N), the read-out image data is replaced with the mask data in regards to the odd-numbered pixels for odd-numbered horizontal lines, as well as even-numbered pixels for even-numbered horizontal lines.

Additionally, with respect to driving video data DFI1 (N), it is possible for read-out image data in regards to odd-numbered pixels for odd-numbered horizontal lines, as well as even-numbered pixels for even-numbered horizontal lines, to be replaced with the mask data. With such constitution for the driving video data DFI2 (N), it is possible for the read-out image data in regards to even-numbered pixels for odd-numbered horizontal lines, as well as odd-numbered pixels for even-numbered horizontal lines, to be replaced with the mask data.

Also in the present variation, the interpolation image DFR (N+½) is visually recognized, by means of #2 driving video data DFI2 (N) of #N frame and the first driving video data DFI1 (N+1) of the #(N+1) frame. In reproducing moving images in this manner, it is possible to reduce moving image blurring and flickering (screen flickering), and to make the viewer feel that the images are moving in a smooth manner.

In particular, in the present modification example, in cases in which the mask data are placed in a checkered pattern (checkerboard) within the image, the compensation effects of both movements in the vertical direction, as in the first embodiment, as well as movements in the horizontal direction, as in Modification Example 2, can be achieved.

A4.5 Modification Example 5

In addition, the fourth modification example described conditions in which read-out image data and mask data are alternately positioned in horizontal and vertical directions, in single pixel units. However, the read-out image data and the mask data may also be alternately positioned in block units of r pixels (r being an integer equal to/greater than 1) in the horizontal direction, and s pixels (s being an integer equal to/greater than 1) in the vertical direction. Even in such cases, the interval between the two frames can be interpolated in an effective manner through utilizing the nature of human vision. Consequently, compensation can be achieved so that the displayed moving image moves in a smooth manner. This constitution is also effective in achieving the compensation effects of movement in the horizontal and vertical directions.

B. Embodiment 2

In the first embodiment, there was described a case in which frame video data stored in the frame memory 20 is read twice at cycle Tfi, which corresponds to twice the cycle speed of frame cycle Tfr, thereby generating driving video data corresponding to the respective read-out image data. However, the frame video data stored in the frame memory 20 may also be read by a cycle speed that is 3 or more times the cycle speed of frame cycle Tfr, thereby generating driving video data corresponding to the respective read-out image data.

In the second embodiment, the frame video data housed within the frame memory 20 is read at a cycle speed that is three times the cycle speed of the frame cycle Tfr (⅓ the time required). In this case, the first and third read-out image data is modified, but the second read-out image data is not modified. Other aspects of the second embodiment are identical to the first embodiment.

Figure 10:
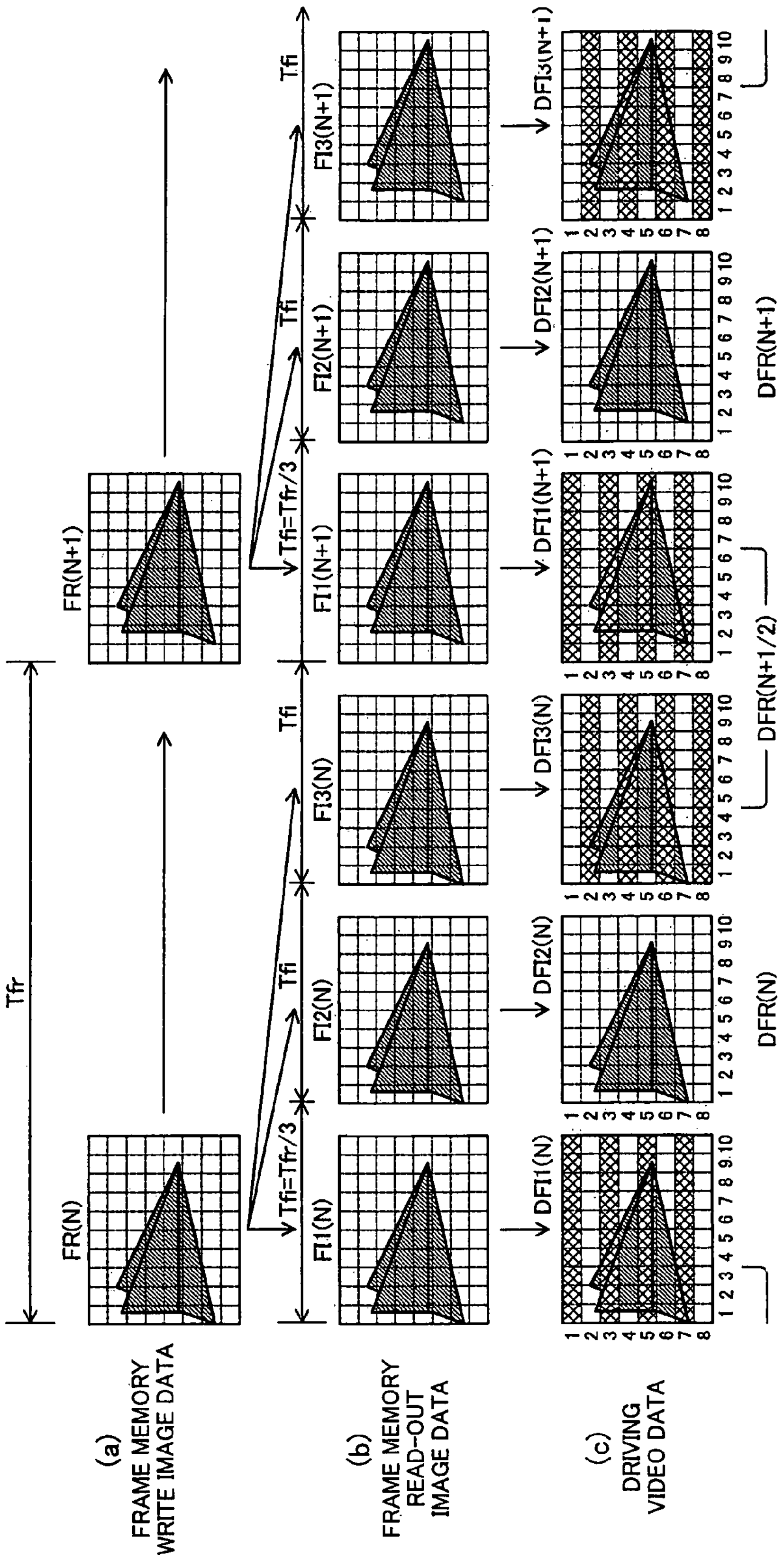
FIG. 10 shows the generated driving video data according to Embodiment 2.

FIG. 10 is an explanatory drawing that shows driving video data generated in Embodiment 2. FIG. 10 shows cases in which frame video data of #N frame (N being an integer equal to/greater than 1) and frame video data of #(N+1) frame are read in a single cycle at twice the length of time of the frame cycle (TrfX2), thereby generating driving video data. Moreover, in summarily referring to data in regards to the #N frame and #(N+1) frame below, the additional characters (N) and (N+1) are sometimes used.

With this constitution, as shown in the row (b) of FIG. 10, the frame video data stored in the frame memory 20 is read out at a cycle Tfi which is triple the cycle speed of the frame cycle Tfr, and are sequentially output as read-out image data FI1 to FI3 of the first through third read-outs. As shown in the row (c) of FIG. 10, driving video data DFI1 is generated for the first read-out image data FI1, driving video data DFI2 is generated for the second read-out image data FI2, and driving video data DFI3 is generated in response for the third read-out image data FI3.

Among the three sets of driving video data DFI1 to DFI3 generated in a single frame, portions of the read-out image data of driving video data DFI1 and DFI3, of the first and third read-outs, constitute image data replaced with the mask data. In the row (c) of FIG. 10, the odd-numbered horizontal line data (shown with crosshatching in the row (c) of FIG. 10) of driving video data DFI1 of the first read-out are replaced with the mask data, and the even-numbered horizontal line data (shown with crosshatching in the row (c) of FIG. 10) of driving video data DFI3 of the third read-out are replaced with the mask data. The driving video data DFI2 of the second read-out is identical to read-out image data FI2.

Herein, the second driving video data DFI2 (N) in the frame cycle of the #N frame (N being an integer equal to or greater than 1) constitutes the read-out image data FI2 (N) of the frame video data FR (N) of the #N frame read from the frame memory 20, so the frame image DFR (N) of #N frame will be represented by this driving video data DFI2 (N).

Also, the second driving video data DFI2 (N+1) in the frame cycle of the #(N+1) frame constitutes the read-out image data FI2 (N+1) of the frame video data FR (N+1) of the #(N+1) frame read from the frame memory 20. Accordingly, the frame image DFR (N+1) of #(N+1) frame will be represented by this driving video data FI2 (N+1).

The third driving video data DFI3 (N) in the frame cycle of the #N frame is generated based on the third read-out image data FI3 (N) of the #N frame. The first driving video data DFI1 (N+1) in the frame cycle of the #(N+1) frame is generated based on the first read-out image data FI1 (N+1) of the #(N+1) frame.

In the third driving video data DFI3 (N) in the frame cycle of the #N frame, mask data is placed on the even-numbered horizontal lines. In the first driving video data DFI1 (N+1) in the frame cycle of the #(N+1) frame, mask data is placed on the odd-numbered horizontal lines.

The positional relationship of the mask data between driving video data DFI2 (N) and driving video data DFI1 (N+1) is complementary. Therefore, due to the nature of human vision to see a residual image, the interpolation image DFR (N+½) is sensed by the viewer, by means of the driving video data DFI3 (N) of the third read-out of #N frame, and driving video data DFI1 (N+1) of the first read-out of #(N+1) frame.

Moreover, interpolation between frames can be achieved in the same manner by means of a combination of the third driving video data DFI3 (N−1) of the #(N−1) frame (not shown) and the first driving video data DFI1 (N) of #N frame; or a combination of the third driving video data DFI3 (N+1) of #(N+1) frame and the first driving video data DFI1 (N+2) of #(N+2) frame not shown in the figure.

Accordingly, in reproducing images according to the Embodiment 2, it is possible to reproduce such images so as to reduce the blurring and flickering (screen flickering) of such images, and to make the viewer feel that the images are moving in a smooth manner.

In cases such as in Embodiment 1 in which read-out is conducted at a doubled cycle speed, it is possible to compensate for movement in each group (pair) of two frames. However, in the case of the present variation, it is possible to compensate for movement between adjacent frames; consequently, the effectiveness of such compensation of movement is increased.

In addition, the case in which the driving video data of the present embodiment were replaced with the mask data of each horizontal line, similar to the first embodiment, was used as an example; however, driving video data variations in Modification Examples 1 to 5 of the first embodiment may also be applied to the second embodiment.

Moreover, in the embodiment stated above, the case in which the frame video data are read three times at cycle Tfi, which moves at three times the cycle speed of frame cycle Tfr, was used as an example; however, read-out may be conducted 4 or more times, at cycle speeds that are 4 times or greater than the cycle speed of frame cycle Tfr. In such cases, from amongst the multiple read-out image data of each frame, if the read-out image data read at boundaries of adjacent frames are modified and converted into driving video data, and if at least one of read-out image data other than read-out image data read at the boundaries are left as is as driving video data, the same effects can be obtained.

C. Modification Examples

The present invention is not limited to the embodiments described above, and may be reduced to practice in various other forms without deviating from the spirit of the invention.

C1. Modification Example 1

In the Embodiment 1 described above, the entire area of read-out image data FI2 (N) and read-out image data FI1 (N+1) is targeted by the mask (see the lower part of FIG. 6); however, in cases where portions that display still images and portions that display moving images are mixed together within the frame image, it is possible to have only the part showing moving images to serve as the object of the mask. Such an embodiment is effective in cases in which the moving images are displayed in a window on the computer display and other part of the display shows still image.

With such an embodiment, the movement detecting component 60 determines portions representing moving images within the frame images, based on the frame video data (target data) WVDS and the frame video data (reference data) RVDS (see FIGS. 1 and 2). The signal indicating the portion that shows the moving image within the frame image is then supplied to the driving video data generating controller 510 of the driving video data generator 50 (see FIGS. 1 and 4). The driving video data generating controller 510 then executes the masking processes on the portions showing the moving images of the read-out image data FI2 (N), and the read-out image data FI1 (N+1), according to the moving area data signal MAS (see the lower part of FIG. 6). With such an embodiment, the flickering on portions showing still images is prevented.

C2. Modification Example 2

In the embodiments described above, the description was made on the assumption that the replacement of image data with the mask data was performed according to a predetermined pattern and then the driving video data is generated (see FIGS. 6 to 10). However, the embodiment of the invention not limited thereto. It is also possible to generate driving video data by selecting from among any one of the patterns corresponding to the driving video data in the first embodiment or variations of the driving video data in Modification Examples 1 to 5 of the first embodiment, according to the direction or amount of movement of the moving images.

For example, in Embodiment 1, in cases where the movement vector in the horizontal direction (horizontal vector) in the video is greater than the movement vector in the vertical direction (vertical vector) in the video, it is possible to select either of the patterns between the driving video data second to fifth variations. In cases in which the vertical vector is greater than the horizontal vector, it is possible to select any one of the patterns between the first embodiment, Modification Example 1 or 2 of the Driving video data Modification Examples. In addition, in case where the vertical and horizontal vectors are equal, it is possible to consider selecting either of the patterns Modification Example 4 and 5 of the Driving video data Modification Examples. The same is true for Embodiment 2 as well.

Moreover, in Embodiments 1 and 2, for example, this selection may be made by the driving video data generating controller 510, based on the direction and amount of movement shown by the movement vector detected by the movement amount detecting component 62. Otherwise, it is also possible for the CPU 80 to execute prescribed processing based on the direction and amount of movement shown by the movement vector detected by the movement amount detecting component 62, and to supply the corresponding control information to the driving video data generating controller 510.

The movement vector, for example, can be determined as follows. Specifically, the centers of gravity are calculated with respect to two images by calculating weighted average of the positions of the pixels based on the brightness of each pixel. The vectors, for which the center of gravity of these two images serves as the beginning and end points, are considered to constitute the movement vectors. Additionally, the images may be divided into multiple blocks, the above-described process conducted, and the average values taken to determine the orientation and size of the movement vector.

Further, the third embodiment can be modified such that, for example, the CPU 80 conducts selection of the pattern based on the desired direction and amount of movement indicated by the user, and supplies the corresponding control information to the driving video data generating controller 510.

In addition, for example, the user's specification of the volume of image movement may be achieved by the user making a selection from among "large", "medium", or "small" volumes of movement. Specifically, in regards to the specification of image movement amount by the user, if the user is allowed to specify their desired amount of movement, any method may be used. The table data may contain the mask parameter MP that corresponds to the so-specified amount of movement.

C3. Modification Example 3

The driving video data generator 50 in the embodiments described above are constituted so that the read-out video data signals RVDS read from the frame memory 20 are sequentially latched by the first latch component 520. However, the driving video data generator 50 may be equipped with a flame memory in the upstream side of the first latch component 520. Such an embodiment may be designed in a manner so that it is possible to temporarily write the read-out video data signal RVDS to the frame memory, and to sequentially latch the new read-out image data signals output from the frame memory, by means of the first latch component 520. In such case, the movement detecting component 60 may be input, as image data signals, image data signals written to the frame memory and image data signals read from the frame memory.

C4. Modification Example 4

In the embodiments described above, mask data is generated for each pixel of the read-out image data. However, it is also possible that mask data are generated only for pixels that are to be replaced (see the crosshatch parts of FIGS. 6 to 10). In short, any aspect may be produced in which mask data corresponding to the pixels that are to be replaced are generated, and replacement with the mask data can be executed for the pixels.

C5. Modification Example 5

Further, in Embodiment 1 discussed above, a mask parameter MP value is between 0 and 1. With respect to the process for utilizing the mask parameter MP with the read-out image data, the mask parameter MP is multiplied by the pixel values Crt, Cbt of the complementary colors (see Step S30 in FIG. 5, as well as formulae (7) and (8)). However, other methods may also be utilized to conduct the process for the read-out image data.

For example, calculations utilizing the mask parameter MP may also be utilized for all of the pixel values Y, Crt, and Cbt. Additionally, instead of conducting the conversion from the RGB tone values to the YCrCb tone values, calculations utilizing the mask parameter MP may be directly conducted with regards to the RGB tone values possessed by the read-out image data. Moreover, the process may be executed by referring a look up table which coordinates and stores RGB tone values in the read-out image data or post-conversion YCrCb tone values, related to the post-processing tone values, and which is generated by the utilization of mask parameter MP.

C6. Modification Example 6

In Embodiment 1 described above, in obtaining the complementary color of the color of the pixel of the read-out image data, conversion to the YCrCb system tone values is carried out to obtain the complementary color. However, various other methods may also be utilized to obtain the complementary color of the color of the pixel of the read-out image data.

For example, when the red, green, and blue tone values of the read-out data take the values 0 to Vmax, and the tone values of certain pixels of the read-out image data constitute (R, G, B), the tone values (Rt, Gt, Bt) of their corresponding colors may be calculated by means of the following formulae (12) to (14).

$$Rt=(V\max+1)-R \quad (12)$$

$$Gt=(V\max+1)-G \quad (13)$$

$$Bt=(V\max+1)-B \quad (14)$$

C7. Modification Example 7

In the embodiments described above, application of a liquid crystal panel in a projector was explained as an example. However, the invention may also be applied to devices other than a projector, such as a direct view type of display device. Besides a liquid crystal panel, various image display devices, such as a PDP (plasma display panel) or ELD (electro luminescence display) may also be applied. In addition, the invention may also be applied to projectors that utilize DMD (Digital Micromirror Device, Texas Instruments Corporation trademark).

C8. Modification Example 8

In the embodiments described above, the image data indicate the colors of each pixel at RGB tone values that show the intensity of each color composition of red, green, and blue. However, the image data may also indicate the colors of each pixel with other tone values. For example, the image data may also indicate the colors of each pixel with YCrCb tone values. In addition, the image data may also indicate the colors of each pixel with the tone values of other color systems, such as L*a*b*, or L*u*v*.

In such aspects, according to Step S40 of FIG. 5, conversion from the YCrCb tone values to the tone values of the color system of these image data may be conducted. In cases in which the image data indicate the colors of each pixel at YCrCb tone values, Steps S10 and S40 of FIG. 5 may be omitted.

C9. Modification Example 9

In the embodiments described above, a case in which the blocks of the memory write controller, the memory read-out controller, the driving video data generator, and the movement detecting component for generating the driving video data are constituted by hardware, are described by way example. However, some the blocks could instead be constituted by software, so that they may implemented by means of the reading and execution of computer software by the CPU.

The Program product may be realized as many aspects. For example:

(i) Computer readable medium, for example the flexible disks, the optical disk, or the semiconductor memories;

(ii) Data signals, which comprise a computer program and are embodied inside a carrier wave;

(iii) Computer including the computer readable medium, for example the magnetic disks or the semiconductor memories; and (iv) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. Image data processing device for generating driving video data for driving an image display device, comprising:

a frame video data acquiring unit which acquires first and second frame video data, the first frame video data representing a first original image, the second frame video data representing a second original image that is to be displayed after the first original image; and a driving video data generating unit which generates first through fourth driving video data that respectively represent first through fourth driving images to be sequentially displayed on the image display device, wherein the driving video data generating unit generates the first and second driving video data based on the first frame video data; and generates the third and fourth driving video data based on the second frame video data, wherein color of pixel in a part of the second driving image constitutes first complementary color of color of corresponding pixel in the first driving image, or color that can be generated by mixing the first complementary color and an achromatic color;

color of pixel in a part of the third driving image constitutes second complementary color of color of corresponding pixel in the fourth driving image, or color that can be generated by mixing the second complementary color and an achromatic color; and the pixel in the part of the second driving image and the pixel in the part of the third driving image respectively belong to areas that are not mutually overlapping within an image.

2. The device of claim 1, wherein the first driving image is an image which is obtainable by enlarging or reducing the first original image;

color of pixel in other part of the second driving image is same color as color of corresponding pixel in the first driving image;

the fourth driving image is an image which is obtainable by enlarging or reducing the second original image; and color of pixel in other part of the third driving image is same color as color of corresponding pixel to the fourth driving image.

3. The device of claim 2, further comprising:

a movement detecting unit that calculates an amount of movement of the second original image from the first original image, based on the first and second frame video data, wherein the driving video data generating unit determines the color of the pixel in the part of the second driving image based on the first frame video data and the amount of movement; and determines the color of the pixel in the part of the third driving image based on the second frame video data and the amount of movement.

4. The device of claim 3 wherein the driving video data generating unit determines the color of the pixel in the part of the second driving image such that the greater the amount of movement is, the color of the pixel in the part of the second driving image is more approximate to the first complementary color; and determines the color of the pixel of the part of the third driving image such that the smaller the amount of movement is, the color of the pixels in the part of the third driving image is more approximate to an achromatic color.

5. The device of claim 2 further comprising:

a movement detecting unit that calculates direction of movement of the second original image from the first original image based on the first and second frame video data, wherein the driving video data generating unit determines the pixel in the part of the second driving image and the pixel in the part of the third driving image, based on the direction of movement.

6. An image display device comprising:

the image data processing device of claim 1; and the image display device.

7. A method for generating driving video data for driving an image display device, comprising:

(a) generating first driving video data that represents a first driving image to be displayed on an image display device based on first frame video data that represents a first original image;

(b) generating second driving video data that represents a second driving image to be displayed on the image display device after the first driving image, based on the first frame video data;

(c) generating third driving video data that represents a third driving image to be displayed on the image display device after the second driving image, based on second frame video data that represents a second original image to be displayed after the first original image; and (d) generating fourth driving video data that represents a fourth driving image to be displayed on the image display device after the third driving image based on the second frame video data, wherein color of pixel in a part of the second driving image constitutes first complementary color of color of corresponding pixel in the first driving image, or color that can be generated by mixing the first complementary color and an achromatic color;

color of pixel in a part of the third driving image constitutes second complementary color of color of corresponding pixel in the fourth driving image, or color that can be generated by mixing the second complementary color and an achromatic color; and the pixel in the part of the second driving video data and the pixel in the part of the third driving video data respectively belong to areas that are not mutually overlapping within an image.

8. The method of claim 7, wherein the first driving image is an image which is obtainable by enlarging or reducing the first original image;

color of pixel in other part of the second driving image is same color as color of corresponding pixel in the first driving image;

the fourth driving image is an image which is obtainable by enlarging or reducing the second original image; and color of pixel in other part of the third driving image is same color as color of corresponding pixel to the fourth driving image.

9. The method of claim 8, further comprising:

calculating an amount of movement of the second original image from the first original image, based on the first and second frame video data, determining the color of the pixel in the part of the second driving image based on the first frame video data and the amount of movement; and determining the color of the pixel in the part of the third driving image based on the second frame video data and the amount of movement.

10. A computer program product for generating driving video data for driving an image display device, comprising:

a non-transitory computer readable medium having stored thereon a computer program, the computer program having:

portion which is configured to generate first driving video data that represents a first driving image to be displayed on an image display device based on first frame video data that represents a first original image;

portion which is configured to generate a second driving video data that represents a second driving image to be displayed on the image display device after the first driving image, based on the first frame video data;

portion which is configured to generate third driving video data that represents a third driving image to be displayed on the image display device after the second driving image based on second frame video data that represents a second original image to be displayed after the first original image; and portion which is configured to generate fourth driving video data that represents a fourth driving image to be displayed on the image display device after the third driving image based on the second frame video data, wherein color of pixel in a part of the second driving image constitutes first complementary color of color of corresponding pixel in the first driving image, or color that can be generated by mixing the first complementary color and an achromatic color;

color of pixel in a part of the third driving image constitutes second complementary color of color of corresponding pixel in the fourth driving image, or color that can be generated by mixing the second complementary color and an achromatic color; and the pixel in the part of the second driving video data and the pixel in the part of the third driving video data respectively belong to areas that are not mutually overlapping within an image.

11. The computer program product of claim 10, wherein the first driving image is an image which is obtainable by enlarging or reducing the first original image;

color of pixel in other part of the second driving image is same color as color of corresponding pixel in the first driving image;

the fourth driving image is an image which is obtainable by enlarging or reducing the second original image; and color of pixel in other part of the third driving image is same color as color of corresponding pixel to the fourth driving image.

* * * * *